US012167034B2

United States Patent
Salmon-Legagneur et al.

(10) Patent No.: US 12,167,034 B2
(45) Date of Patent: Dec. 10, 2024

(54) METHOD AND APPARATUS FOR ENCODING AND DECODING VOLUMETRIC VIDEO

(71) Applicant: INTERDIGITAL CE PATENT HOLDINGS, SAS, Paris (FR)

(72) Inventors: Charles Salmon-Legagneur, Rennes (FR); Jean Le Roux, Rennes (FR); Franck Aumont, Rennes (FR); Yvon Legallais, Rennes (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 17/912,754

(22) PCT Filed: Mar. 24, 2021

(86) PCT No.: PCT/EP2021/057531
§ 371 (c)(1),
(2) Date: Sep. 19, 2022

(87) PCT Pub. No.: WO2021/191252
PCT Pub. Date: Sep. 30, 2021

(65) Prior Publication Data
US 2023/0143601 A1 May 11, 2023

(30) Foreign Application Priority Data
Mar. 26, 2020 (EP) .................................... 20315057

(51) Int. Cl.
*H04N 19/119* (2014.01)
*G06T 7/11* (2017.01)
(Continued)

(52) U.S. Cl.
CPC .............. *H04N 19/597* (2014.11); *G06T 7/11* (2017.01); *H04N 13/388* (2018.05); *H04N 19/119* (2014.11); *H04N 19/174* (2014.11)

(58) Field of Classification Search
CPC .............. H04N 19/597; H04N 13/388; H04N 19/119; H04N 19/174; H04N 19/136; G06T 7/11
See application file for complete search history.

(56) References Cited

U.S. PATENT DOCUMENTS

2006/0062454 A1* 3/2006 Fan ..................... G06V 10/267
382/164
2019/0087979 A1* 3/2019 Mammou ............ H04N 19/597
(Continued)

OTHER PUBLICATIONS

Xie et al., "Viewport Adaptation-Based Immersive Video Streaming: Perceptual Modeling and Applications", Cornell University Library, ARXIV Document 1802.06057, Ithaca, New York, Feb. 16, 2018, 12 pages.
(Continued)

*Primary Examiner* — Tat C Chio
(74) *Attorney, Agent, or Firm* — Condo Roccia Koptiw LLP

(57) ABSTRACT

Methods, devices and stream are disclosed to encode and decode a scene (such as a point cloud) in the context of a patch-based transmission of a volumetric video content. The present principles relate a method of dividing an atlas image in regions, a region being associated with a sector of the space of the scene and packing patches obtained by projecting points comprised in the associated sector only. The atlas and related metadata are encoded in a data stream; At the rendering, a set of sectors is selected based on the current field of the user. Only pixels of regions associated with the selected sectors are accessed to generate the viewport image representative of the scene viewed from the current point of view.

18 Claims, 6 Drawing Sheets

(51) Int. Cl.
*H04N 13/388* (2018.01)
*H04N 19/174* (2014.01)
*H04N 19/597* (2014.01)

(56) References Cited

U.S. PATENT DOCUMENTS

2021/0295567 A1* 9/2021 Lee .................. G06T 9/001
2022/0377327 A1* 11/2022 Park ................ H04N 19/167

OTHER PUBLICATIONS

Wang et al., "[V-PCC CE 2.19] Signaling 6DoF Coordinates of V-PCC Sub-Point Clouds (Tiles) in V-PCC Bit-Streams", International Organization for Standardization, Coding of Moving Pictures and Audio, ISO/IEC JTC1/SC/WG11, Document MPEG2019/m49357, Gothenburg, Sweden, Jul. 2019, 4 pages.

Dore et al., "Auxilliary Patches", International Organization for Standardization, Coding of Moving Pictures and Audio, ISO/IEC JTC1/SC/WG11, Document: MPEG2019/m52429, Brussels, Belgium, Jan. 2020, 9 pages.

Hamza et al., "Evaluation Results for CE on Partial Access of PC Data", International Organization for Standardization, Coding of Moving Pictures and Audio, ISO/IEC JTC1/SC/WG11, Document: m50051, Geneva, Switzerland, Oct. 2019, 7 pages,.

Wang et al., "On Metadata for Immersive Media Content for Viewport Dependent Media Processing", International Organization for Standardization, Coding of Moving Pictures and Audio, ISO/IEC JTC1/SC/WG11, Document: MPEG/m52974, Alpbach, Australia, 9 pages.

Tourapis et al., "Volumetric Tiling Information SEI message for V-PCC", International Organization for Standardization, Coding of Moving Pictures and Audio, ISO/IEC JTC1/SC/WG11, Document: MPEG2019/m49414, Gothenburg, Sweden, Jul. 2019, 5 pages.

* cited by examiner

METHOD AND APPARATUS FOR ENCODING AND DECODING VOLUMETRIC VIDEO

CROSS REFERENCE TO RELATED APPLICATIONS

This application is a U.S. National Stage Application under 35 U.S.C. 371 of International Patent Application No. PCT/EP2021/057531, filed Mar. 24, 2021, which is incorporated herein by reference in its entirety.

This application claims the benefit of European Patent Application No. 20315057.8, filed Mar. 26, 2020.

1. TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD).

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member.

A technical approach for the encoding of volumetric video is based on the projection of the 3D scene onto a multiplicity of 2D images, called patches, packed into atlases which can be further compressed using conventional video encoding standards (e.g., HEVC). At the decoding, using every patch of an atlas to prepare the rendering of the 3D scene in the current viewport is not always required, nor desirable. Indeed, some patches comprise information about points that are not visible from the current point of view and, for a given part of the 3D scene to be rendered, some patches comprise information more accurate than other patches comprising information for the same part of the scene when viewed from the current point of view.

The success of emerging technology like immersive media (MPEG Immersive Video—MIV based on a 3DoF+ approach) is often determined by the wide adoption of this technology on everyday devices like on embedded low-end user devices like digital TV, set-top-boxes or tablets, or wireless HMD. However, these devices have low GPU resource and the immersive technology must be also adapted for this type of devices. A possible approach could be to generate two types of content, one degraded immersive content for low-end user devices, and one to get richer immersive experience on high-end user gamers' PC. Such an approach requires the storage of several versions of a same content and the knowledge of the type of client device for the transmission of the adapted version. Another approach is based on tiling methods. However, such an approach has the drawback to introduce latency in the streaming as the server has to stream the tiles corresponding to the current direction of the user's point of view, what induces a motion to photon delay (i.e. the time between the moment the user moves toward a direction, and the moment the renderer receives the content from the server and displays it on screen).

There is a lack of a data stream format for encoding volumetric video which enables the decoder to select a subset of patches within the obtained atlas, to be accessed and used by the rendering engine, the subset depending on the current location and direction of user's point of view.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

In the context of a patch-based representation of a volumetric video content, the present principles relate to a method for decoding a volumetric scene and generating a viewport image of the seen visible from the current point of view of a user. The method comprises:

obtaining a source image divided in regions, a region being associated with a sector of the space of a scene;

selecting at least one sector according to a current field of view of a virtual camera controlled by the use and located in said space of the scene; and accessing pixels of regions of the source image associated with the selected at least one sector for generating the viewport image of the scene for the field of view of the user.

In an embodiment, the source image is packing patch pictures. A patch picture is a part of one region only and is a projection of points of the scene comprised in the sector associated with this one region. For a volumetric video, that is a sequence of source images, the association of a region with a sector may change over the time.

In another embodiment, a sector of the space of the scene is associated with two regions. A first region comprises one patch picture being a projection points of the sector visible from a given point of view, for instance a central point of view of a 3DoF+ viewing zone. A second region packs patch pictures which are projections of points of the same sector not visible from said given point of view and called peripheral patches.

The source image may be obtained from a data stream comprising metadata associating each region of the source image with a sector of the space of the scene. In a variant, metadata are obtained from a different source.

The present principles also relate to a device comprising a processor configured for implementing the method above.

The present principles also relate to a method comprising generating an image divided in regions, a region being associated with a sector of the space of a scene. Points of a scene comprised in a sector of a scene are projected into pixels of a region associated with said sector.

In an embodiment, the image is packing patch pictures. A patch picture belongs to one unique region and is a projection of points of the scene comprised in the sector associated with this one region.

In another embodiment, a sector of the space of the scene is associated with two regions. A first region comprises one patch picture being a projection points of the sector visible from a given point of view, for instance a central point of view of a 3DoF+ viewing zone. A second region packs patch pictures which are projections of points of the same sector not visible from said given point of view and called peripheral patches.

The method may further comprise encoding, in a data stream, the image and metadata associating each region of the source image with a sector of the space of the scene. In a variant, the metadata are encoded in a separate data stream.

The present principles also relate to a device comprising a processor configured for implementing the method above. The present principles also relate to a data stream generated by this method.

4. BRIEF DESCRIPTION OF DRAWINGS

The present disclosure will be better understood, and other specific features and advantages will emerge upon reading the following description, the description making reference to the annexed drawings wherein.

5. DETAILED DESCRIPTION OF EMBODIMENTS

Figure 1:
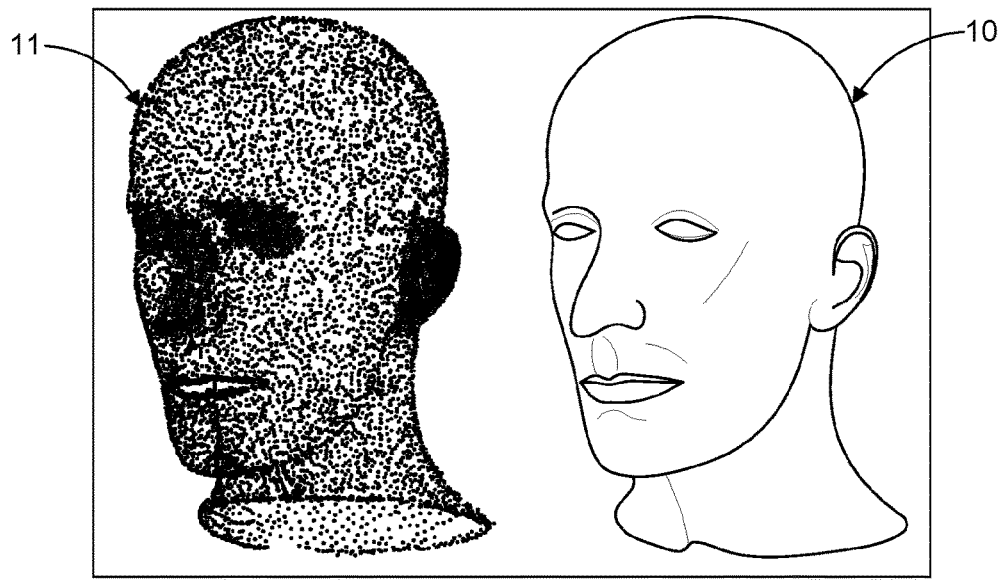
FIG. 1 shows a three-dimension (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

In the context of a patch-based encoding of a 3D scene, the data stream comprises metadata comprising information about each patch of the atlas. Via these patch data, each patch is associated to projection data comprising the parameters of the virtual camera which captures the patch at the encoding. At the decoding, these parameters (e.g. pose and 3D-to-2D projection method) of the virtual cameras are retrieved from the stream, in order to perform the inverse 2D-to-3D conversion.

A volumetric video is prepared (i.e. analyzed and encoded) to be rendered from a viewing zone that is a part of the 3D space of the 3D scene. Points of the 3D scene visible from any point of view of this viewing zone are encoded in the patches of the atlas. If the decoded 3D scene is viewed from a point of view outside of the viewing zone, some points are missing and the 3D scene is incomplete and/or present strong visual artifacts. In a 3DoF rendering mode, the viewing zone is limited to a point of the 3D space of the 3D scene. In a 3DoF+ rendering mode, the viewing zone is a limited region around an initial point of the 3D space. In 6DoF, the viewing zone is the entire 3D space of the 3D scene.

The present principles relate methods, data stream and devices for associating patches of the atlas with a validity domain that is a part of the viewing zone. This association is encoded via formatted metadata linked to the atlas in the data stream. When decoded, these metadata allow the rendering engine to select the subset of patches in the atlas which are associated to a validity domain encompassing the current point of view. Validity domains are determined to make these patches the best suited to the current point of view as comprising information for every visible point of the 3D scene from this point of view and the most accurate information for these points among the different patches encoding these points.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:

from a capture of a real object shot by a rig of cameras, optionally complemented by depth active sensing device;

from a capture of a virtual/synthetic object shot by a rig of virtual cameras in a modelling tool;

from a mix of both real and virtual objects.

Figure 2:
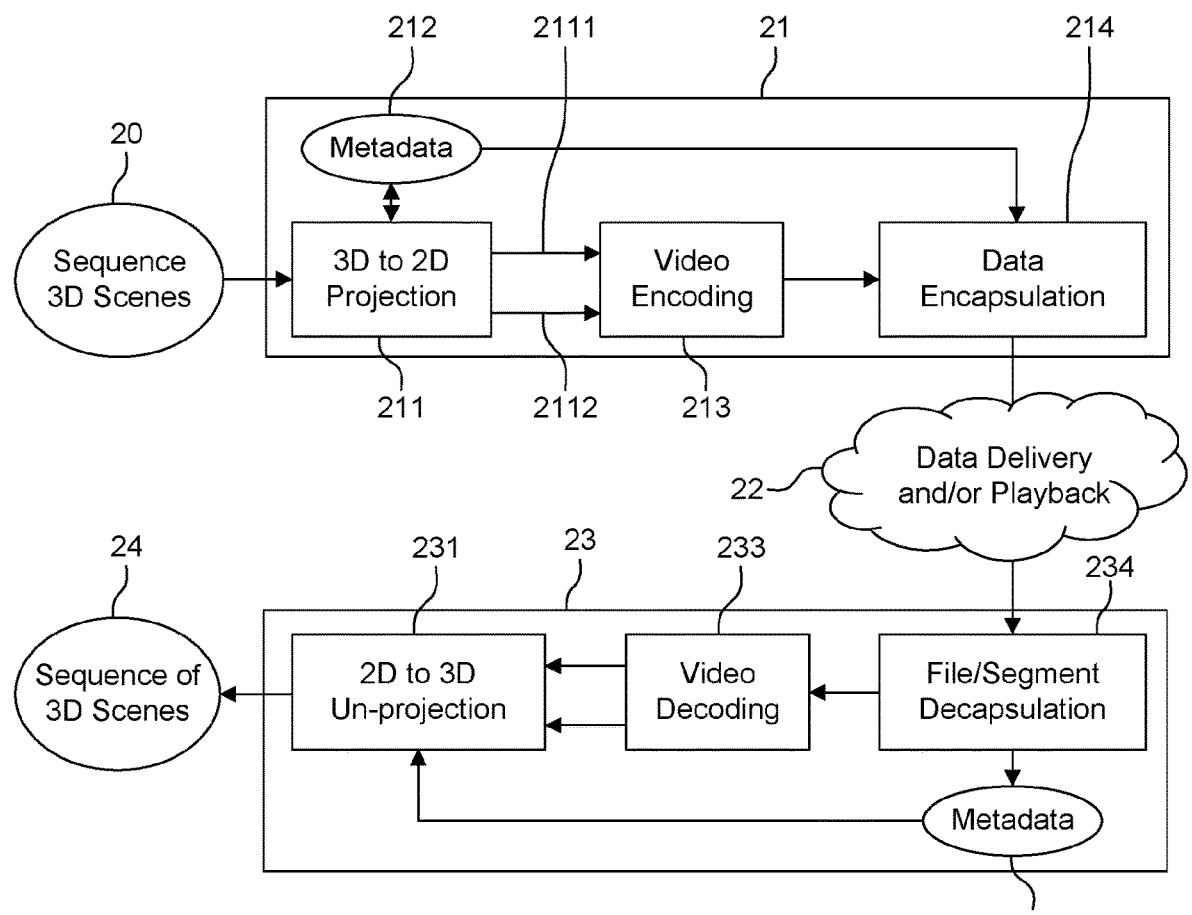
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes is provided according to a viewing zone from which the 3D scene may be viewed at the decoding side. 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

According to the present principles, at least one validity domain is determined by projection circuit 211. A validity domain is an information describing a part of the viewing zone. A validity domain may be representative of a connected 3D region or a possibly disconnected union of connected regions. Projection circuit 211 associates every patch it generated with a validity domain. In a variant, projection circuit 211 does not associate some of the patches with any validity domain, indicating that the validity domain of this patch is the entire viewing zone. A part of the 3D space is delimited and associated with a patch when the information projected onto this patch are necessary and accurate to re-build the 3D scene for a view from a point of view encompassed in this part of the 3D space at the rendering. A same validity domain may be associated with several patches. A description of determined validity domains and the associations between patches and validity domains is added to metadata 212, so this information is going to be encapsulated in the data stream by data encapsulation circuit 214.

In an embodiment of the present principles, validity domains are determined in relation to centers of projection. The validity domain determined for one center of projection is associated with every patch generated according to this projection center as described in reference to FIG. 5. Descriptions of validity domains added in metadata 212 are associated with projection data describing the different projection operations used to generate patches of the atlas.

A video encoding circuit 213 encodes sequence of frames 2111 and 2112 as a video.

Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:
  JPEG, specification ISO/CEI 10918-1 UIT-T Recommendation T.81, https://www.itu.int/rec/T-REC-T.81/en;
  AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-Fen);
  3D-HEVC (an extension of HEVC whose specification is found at the ITU website, T recommendation, H series, h265, http://www.itu.int/rec/T-REC-H.265-201612-I/en annex G and I);
  VP9 developed by Google; or
  AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:
  a local memory, e.g. a video memory or a RAM (or Random-Access Memory), a flash memory, a ROM (or Read Only Memory), a hard disk;
  a storage interface, e.g. an interface with a mass storage, a RAM, a flash memory, a ROM, an optical disc or a magnetic support;
  a communication interface, e.g. a wireline interface (for example a bus interface, a wide area network interface, a local area network interface) or a wireless interface (such as a IEEE 802.11 interface or a Bluetooth® interface); and
  a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. A frame is an atlas, that is image data comprising a set of patches packed in the frame. A patch is image data comprising information to retrieve points of the 3D scene to reconstruct. In a variant, video decoder 233 provides two sequences of frames, one comprising color information, the other comprising depth information.

According to the present principles, metadata 232 comprise at least one validity domain associated with at least one patch of the atlas. A validity domain is an information representative of a part of said viewing zone of the 3D space of the 3D scene.

A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

A 3D scene is retrieved from an atlas in which a plurality of patches is packed. According to the present principles, circuit 231 de-project pixels of a subset of the patches of the atlas. Circuit 231 selects only patches which are associated (via metadata 232) to a validity domain encompassing the current point of view of the rendering. In a variant, if a patch is associated to no validity domain, this patch is always used for de-projecting.

In an embodiment of the present principles, metadata 232 comprise a collection of a patch data. In a patch data item, the patch is associated with projection data comprising parameters of the projection operation used for generating this patch. Metadata 232 also comprise a collection of projection data and a projection data is associated with a validity domain. In this embodiment, circuit 231 selects, for de-projecting, the patches which are associated with a projection data which is, itself, associated with a validity domain encompassing the current point of view.

Figure 3:
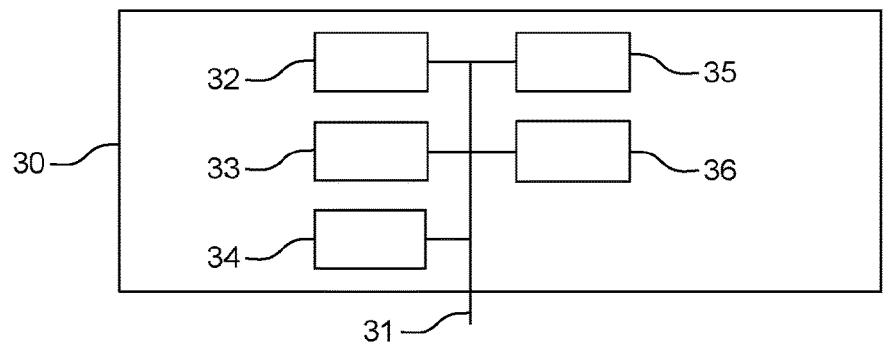
FIG. 3 shows an example architecture of a device which may be configured to implement a method described in relation with FIGS. 11 and 12 according to a non-limiting embodiment of the present principles.
Figure 11:
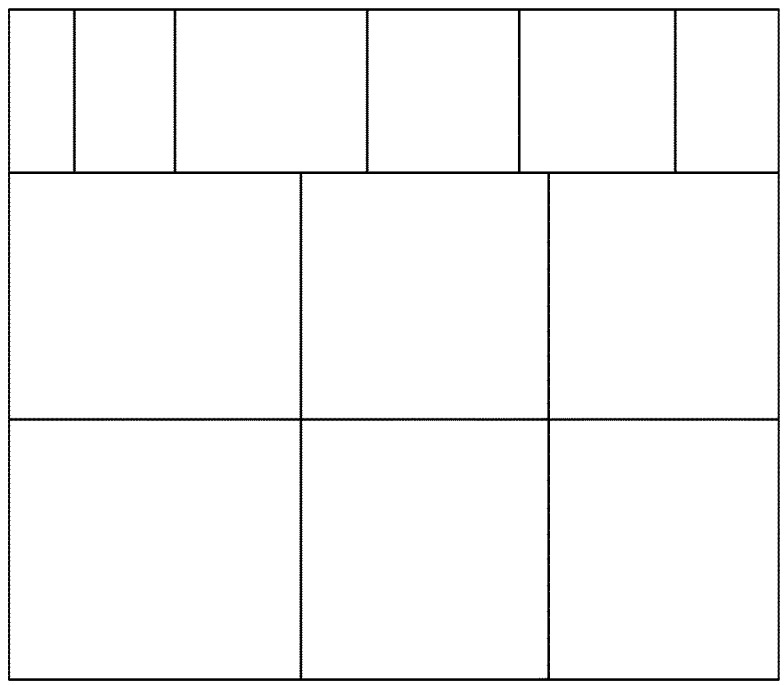
FIG. 11 shows a third layout of a sectorized atlas prepared for a cube mapping according to the present principles.
Figures 12, 13:
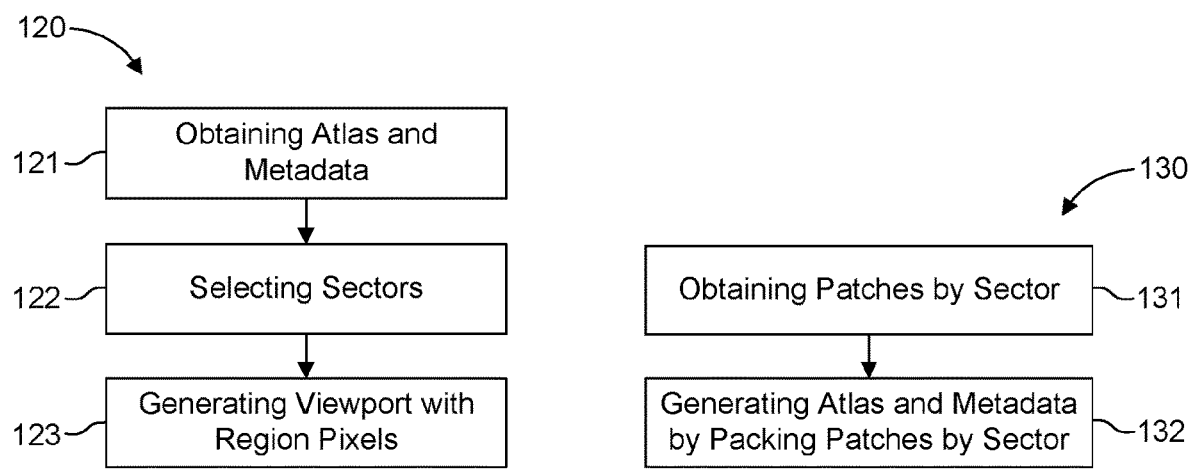
FIG. 12 illustrates a method 120 for generating a viewport image of a scene encoded in an atlas image, according to a non-limiting embodiment of the present principles.
FIG. 13 illustrates a method 130 for encoding a scene, according to a non-limiting embodiment of the present principles.

FIG. 3 shows an example architecture of a device 30 which may be configured to implement a method described in relation with FIGS. 11 and 12. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:
- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 11 and 12, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 4:
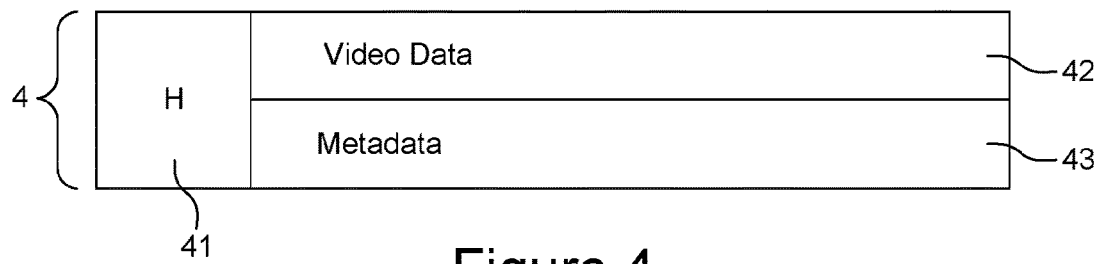
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards). According to the present principles, metadata of element of syntax 43 also comprise at least one validity domain associated with at least one patch of the atlas. A validity domain is an information representative of a part of said viewing zone of the 3D space of the 3D scene and may be encoded according to different representations and structures. Examples of such representations and structures are provided in the present disclosure.

For example, metadata comprise a collection of at least one validity domain. Items of this collection may be indexed, for example by a letter or by an integer. Metadata further comprise a collection of projection data comprising at least a reference to one of the validity domains. The reference may be, for instance the index of the validity domain in the collection or a pointer to the memory address of this data. In this example, metadata also comprise a collection of patch data comprising a reference to a patch and a reference to one of the projection data.

Figure 5:
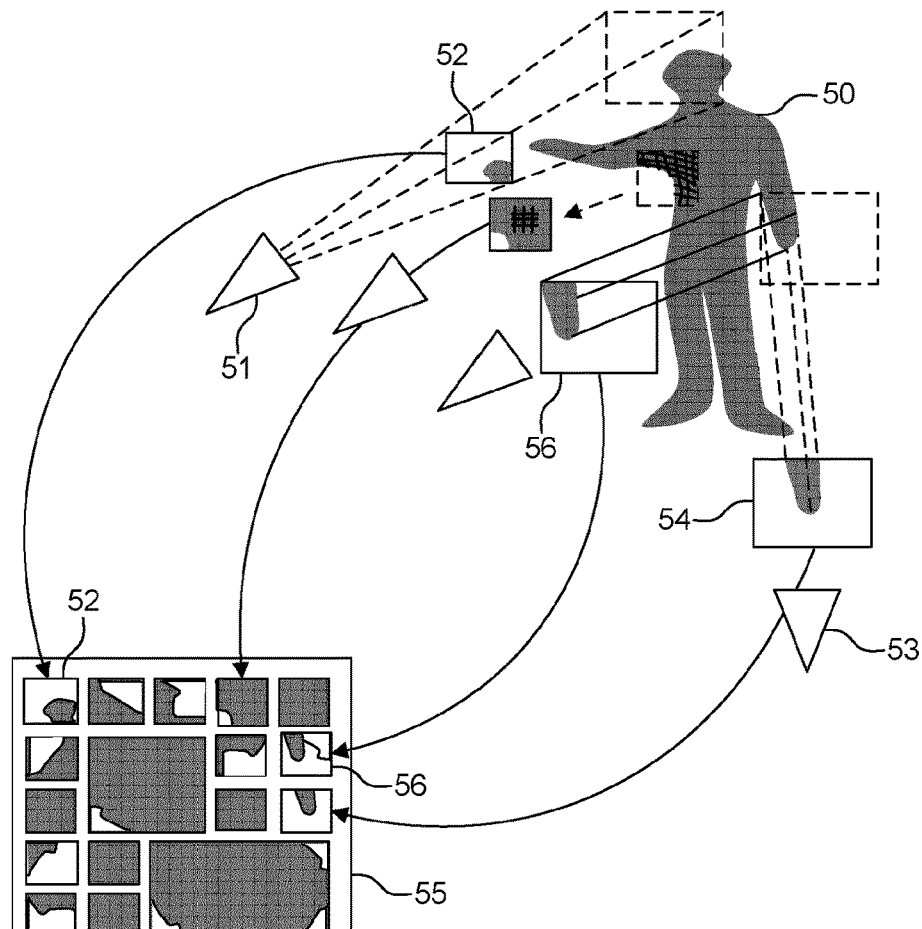
FIG. 5 shows an example of a patch-based representation of a three-dimensional (3D) scene, according to a non-limiting embodiment of the present principles.

FIG. 5 illustrates the patch atlas approach with an example of 4 projection centers. 3D scene 50 comprises a character. For instance, center of projection 51 is a perspective camera and camera 53 is an orthographic camera. Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection of the points captured by camera 51 is mapped onto patch 52 according to a perspective mapping and projection of the points captured by camera 53 is mapped onto patch 54 according to an orthographic mapping.

The clustering of the projected pixels yields a multiplicity of 2D patches, which are packed in a rectangular atlas 55. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 54 and 56.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases.

Figure 6:
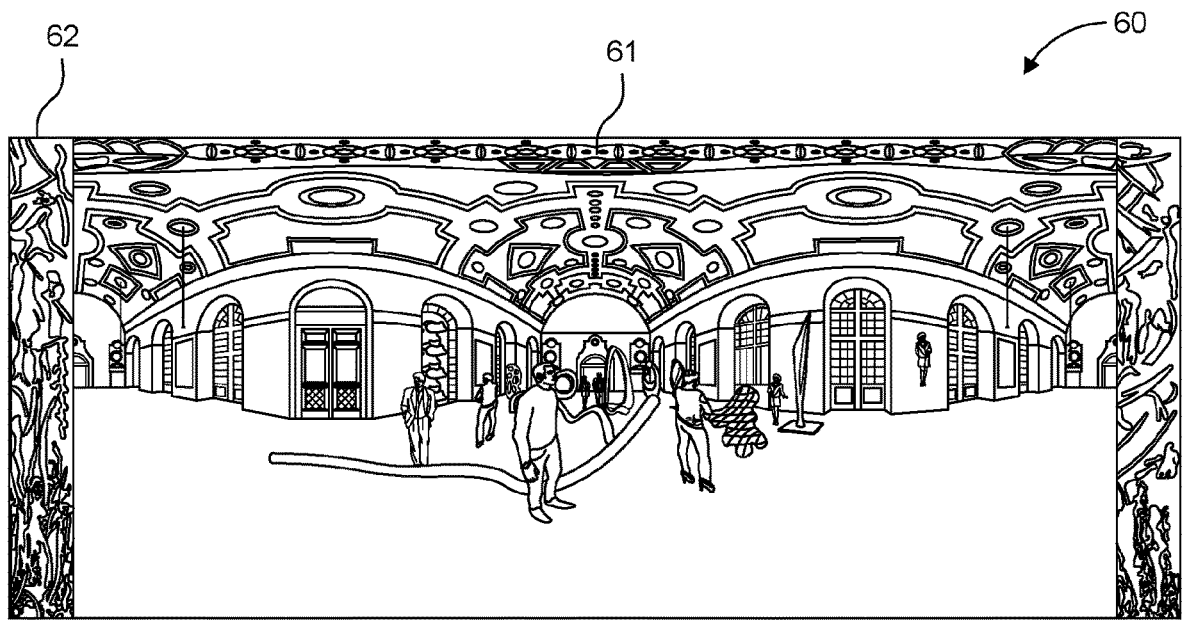
FIG. 6 shows an example of an atlas comprising the texture information of the points of a 3D scene, according to a non-limiting embodiment of the present principles.

FIG. 6 shows an example of a layout of an atlas 60 comprising the texture information (e.g. RGB data or YUV data) of the points of a 3D scene, according to a non-limiting embodiment of the present principles. As explained in relation to FIG. 5, an atlas is an image packing patches, a patch being a picture obtained by projecting a part of the points of the 3D scene.

The layout of an atlas is the way patches are organized on the image plane of the atlas. In the example of FIG. 6, atlas 60 comprises a first part 61 comprising the texture information of the points of the 3D scene that are visible from a point of view and one or more second parts 62. The texture information of the first part 61 may for example be obtained according to an equirectangular projection mapping, an equirectangular projection mapping being an example of spherical projection mapping. In the example of FIG. 6, the second parts 62 are arranged at the left and right borders of the first part 61 but the second parts may be arranged differently. Second parts 62 comprise texture information of parts of the 3D scene that are complementary to the part visible from the point of view. The second parts may be obtained by removing from the 3D scene the points that are visible from the first viewpoint (the texture of which being stored in the first part) and by projecting the remaining points according to the same point of view. The latter process may be reiterated iteratively to obtain at each time the hidden parts of the 3D scene. According to a variant, the second parts may be obtained by removing from the 3D scene the points that are visible from the point of view, for example a central point of view (the texture of which being stored in the first part) and by projecting the remaining points according to a point of view different from the first point of view, for example from one or more second point of view of a space of view centred onto the central point of view (e.g. the viewing space of a 3DoF rendering).

The first part 61 may be seen as a first large texture patch (corresponding to a first part of the 3D scene) and the second parts 62 comprises smaller textures patches (corresponding to second parts of the 3D scene that are complementary to the first part). Such an atlas has the advantage to be compatible at the same time with 3DoF rendering (when rendering only the first part 61) and with 3DoF+/6DoF rendering.

Figure 7:
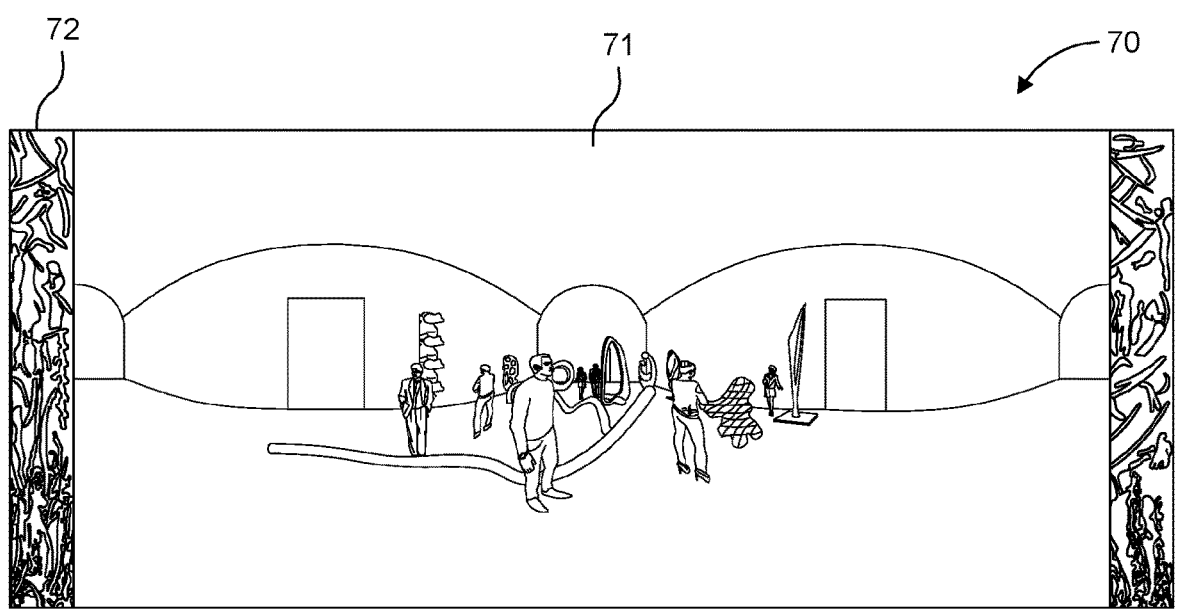
FIG. 7 shows an example of an atlas comprising the depth information of the points of the 3D scene of FIG. 6, according to a non-limiting embodiment of the present principles.

FIG. 7 shows an example of an atlas 70 comprising the depth information of the points of the 3D scene of FIG. 6 and having the same layout than the atlas of FIG. 6, according to a non-limiting embodiment of the present principles. Atlas 70 may be seen as the depth image corresponding to texture image 60 of FIG. 6.

Atlas 70 comprises a first part 71 comprising the depth information of the points of the 3D scene that are visible from the central point of view and one or more second parts 62. Atlas 70 may be obtained in a same way as atlas 60 but contains the depth information associated with the points of the 3D scene instead of the texture information.

For 3DoF rendering of the 3D scene, only one point of view, typically the central point of view, is considered. The user may rotate his head in three degrees of freedom around the first point of view to watch various parts of the 3D scene, but the user cannot move this unique point of view. Points of the scene to be encoded are points which are visible from this unique point of view, and only the texture information is needed to be encoded/decoded for the 3DoF rendering. There is no need to encode points of the scene that are not visible from this unique point of view for a 3DoF rendering as the user cannot access to them.

With regard to 6DoF rendering, the user may move the viewpoint everywhere in the scene. In this case, it is required to encode every point (depth and texture) of the scene in the bitstream as every point is potentially accessible by a user who can move his/her point of view. At the encoding stage, there is no means to know, a priori, from which point of view the user will observe the 3D scene.

With regard to 3DoF+ rendering, the user may move the point of view within a limited space around a central point of view. This enables to experience parallax. Data representative of the part of the scene visible from any point of the space of view is to be encoded into the stream, including the data representative of the 3D scene visible according to the central point of view (i.e. the first parts 61 and 71). The size and shape of the space of view may for example be decided and determined at the encoding step and encoded in the bitstream. The decoder may obtain this information from the bitstream and the renderer limits the space of view to the space determined by the obtained information. According to another example, the renderer determines the space of view according to hardware constraints, for example in relation to capabilities of the sensor(s) that detects the movements of the user. In such a case, if, at the encoding phase, a point visible from a point within the space of view of the renderer has not been encoded in the bitstream, this point will not be rendered. According to a further example, data (e.g. texture and/or geometry) representative of every point of the 3D scene is encoded in the stream without considering the rendering space of view. To optimize the size of the stream, only a subset of the points of the scene may be encoded, for instance the subset of points that may be seen according to a rendering space of view.

In existing art, after having decoded the color and depth atlases, the rendering device carries out the reverse operations for a 3D rendering. The immersive rendering device un-projects each pixel of each patch of the atlases to rebuild a 3D point, and re-projects the 3D point into the viewport of the current pyramid of vision of the user.

This implies two types of operations on the rendering device:
 memory lookups to fetch the color and depth values of each pixel in the atlases (operations capped by the GPU memory bandwidth); and computing to un-project/re-project each point (operations well adapted to massively parallel GPU architecture).

In a typical implementation, the rendering engine pipelines the processing of vertex/fragment shaders, that are executed for each pixel of the atlases, but triggers several memory lookups equals to the size of the atlases. For example, for a 4K HMD supporting up to 15 pixels per degree, an atlas is composed of more than 17M pixels (5.3K×3.3K).

This is approach has a noticeable drawback: the atlases contain patches for any direction (360°×180°), while only the patches belonging to the end-user device Field of View (typically a 90°×90° FOV for a HMD) are effectively visible in the current viewport; then, the rendering engine may read up to 8 times more pixels than necessary.

According to the present principles, for fast rendering on low-end user devices, the number of memory look-ups and de-projections is decreased by reading only the subset of patches in the atlas that may be visible in the current user's field of view; i.e. selecting only the patches appearing in the user view direction.

Figure 8:
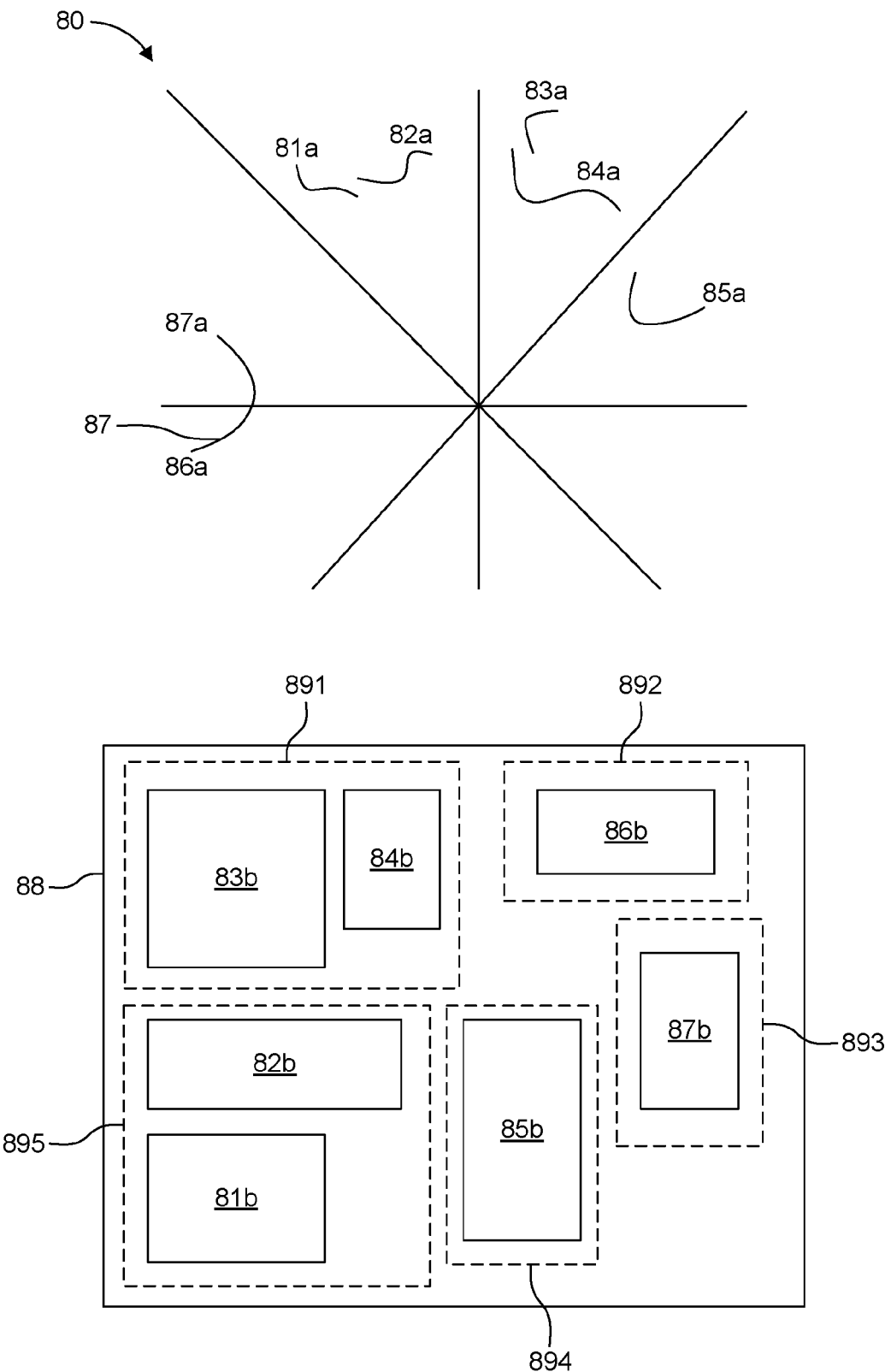
FIG. 8 illustrates an embodiment of a sectorization of the 3D space of the 3D scene.

FIG. 8 illustrates an embodiment of a sectorization of the 3D space of the 3D scene. In this example, a spherical projection and mapping, like Equi-Rectangular Projection (ERP), is selected to project points of the 3D scene onto patches of an atlas. A sector is a disjointed part (i.e. non-overlapping another sector) of the 3D space of the 3D scene. In this particular embodiment, a sector is defined by a solid angle; that is a (theta, phi) range pointing a reference point (e.g. the center point of view of the 3DoF+ viewing box) of the 3D space, where theta and phi are the polar coordinates.

In FIG. 8, space 80 of the scene is divided in eight sectors of the same size. Sectors may have different sizes and may not cover the entire space of the scene. The number of sectors is selected to optimize the encoding according to the principles detailed herein. Scene 80 comprises several objects or parts of objects 81a to 87a. Points of the scene are projected on patches as illustrated on FIG. 5. Parts of objects to be projected on patches are selected in a way that ensures that pixels of a patch are a projection of points of a same sector. In the example of FIG. 8, object 87 have points belonging to two sectors. Then, points of objects 87 are split in two parts 86a and 87a, so, when projected, points of part 86a and points of part 87a are encoded in two different patches. Patches associated with a same sector are packed in a same region of the atlas. For instance, a region is a rectangular area of the atlas image, a region may pack several patches. In a variant a region may have a different shape, for example, a region may be delimited by an ellipse or by a generic polygon. Patches of a same region are projections of points of a same sector. In the example of FIG. 8, five of the eight sectors of the space of the scene comprise points. According to the present principles, atlas image 88 representative of the scene comprises five regions 891 to 895. A region pack patches which are projection of a points belonging to a same sector. For instance, in FIG. 8, region 891 comprises patches 83b and 84b corresponding to groups of points 83a and 84a which belong to a same first sector. Groups of points 86a and 87a, even if parts of a same object 87, as they belong to two separate sectors produce two patches 86b and 87b. Patches 86b is packed in a region 892 while patch 87b is packed in a different region 893. Patch 85b is packed in a region 894 because corresponding points of the scene belong to a second sector and patches 81b and 82b respectively corresponding to groups of points 81a and 82a are packed in a region 895 as being comprised in a same sector.

In another embodiment, patches (and so, groups of points used to generate them) are determined to belong to one sector for a sequence of scenes, that is for a period of time, that is for a sequence of atlas images, for instance for a Group Of Pictures (GOP) of the codec used to compress the video. In this embodiment, a patch keeps the same size and same packing attributes in a sequence of several atlases. An object, for instance object 87, may move from one sector to another one, for instance part 86a may sequentially move toward the sector of part 87a. In this example, patch 87b is big enough to encode every points of object 87, is initially filled with projections of points 87a and finally filled with projections of points 86a plus 87a. Patch 86b is big enough to encode points 86a, initially filled with projections of points 86a and finally filled with a value representative of 'unused pixels'.

Figure 9:
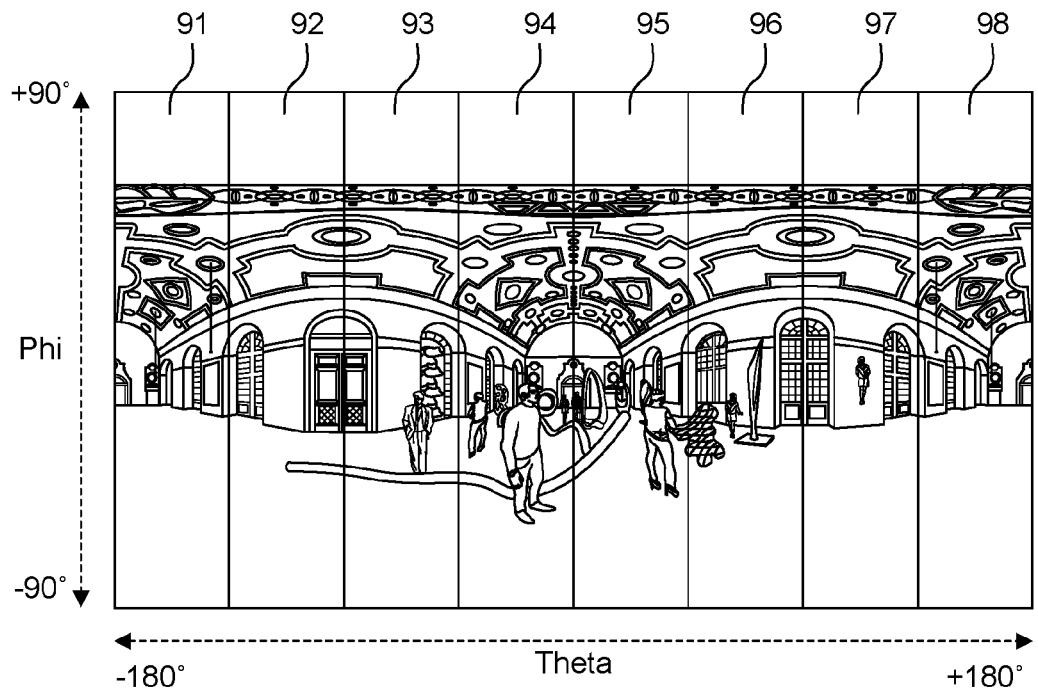
FIG. 9 illustrates a first layout of a sectorized atlas according to the present principles.

FIG. 9 illustrates a first layout of a sectorized atlas according to the present principles. In this example, sectorization follows the spherical partition of the space illustrated in FIG. 8. This division of the space is comparable to orange slices or time zones in geography. To take advantage of the central view of FIGS. 6 and 7, the central patch is split into n sectors (8 in the example of FIG. 9) to obtain 8 regions. In this embodiment, each central region comprises information corresponding to the same angular amplitude and so exactly the same number of pixels when projected onto an ERP image. Peripheral patches are also sorted by sector of same angular amplitude (8 more in the example of FIG. 9), and then packed into peripheral regions 91 to 98. Unlike in central patch, the quantity of data by peripheral region is not the same because it depends on the quantity of parallax information for a given sector. In FIG. 9, the peripheral regions may have different sizes. In a variant, peripheral regions 91 to 98 have a same size. Unused pixels may be filled with a determined value, for instance 0 or 255 for depth atlases and white, grey or black for color atlases.

| Regions | Sector definition | Atlas Area |
| --- | --- | --- |
| 8 panoramic Regions $R_{c\_pan\_i}$ for central patch | For i = 0 to 7 theta [i*45°, i*45° + 45°] and phi [−90°, +90°] | ⅛ of central patch |
| 8 panoramic Regions $R_{p\_pan\_i}$ for peripheral patches | For i = 0 to 7 theta [i*45°, i*45° + 45°] and phi [−90°, +90°] | Around ⅛ of all peripheral patches |

Figure 10:
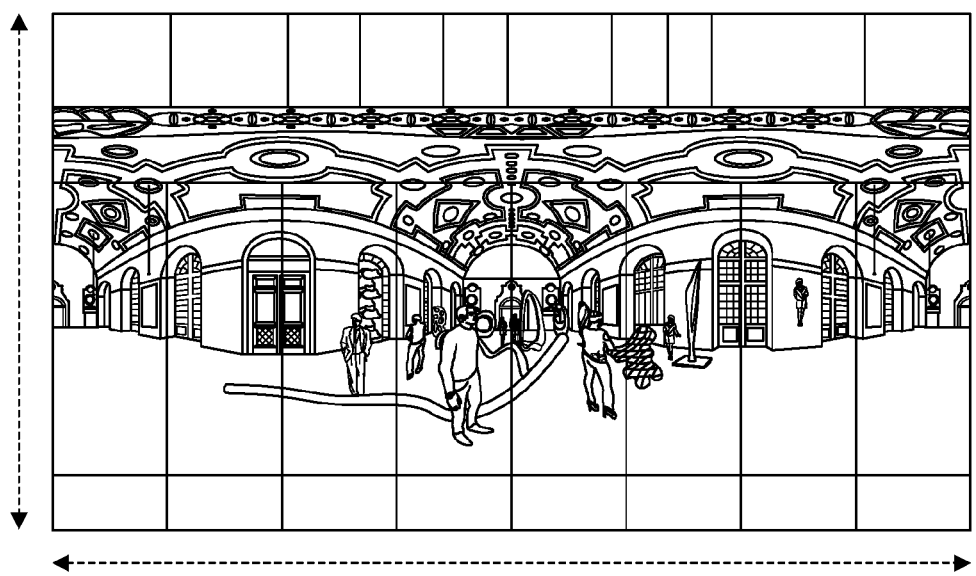
FIG. 10 shows a second layout of a sectorized atlas according to the present principles.

In a 3DoF+ rendering device, a processor manages a virtual camera located in the 3DoF+ viewing zone. The virtual camera defines the point of view and the field of view of the user. The processor generates a viewport image corresponding to this field of view. At any time, depending on the user viewport direction (theta$_{user}$, phi$_{user}$), the renderer selects a number of sectors, at least one sector, for instance 3 or 4 sectors, and, then access and process the same number of central regions and peripheral regions. In the example of FIGS. 8 to 10, only 37.5% (⅜ sectors) or 50% (4/8 sectors) of the patches are processed. The number of selected sectors may be dynamically adapted by the renderer depending on its CPU and/or GPU capabilities. The number of selected sectors by the renderer at any time covers at least the field of view. Additional sectors may be selected to enhance reliability to render peripheral patches at the borders of the current FOV for lateral and/or rotation movements of the user.

FIG. 10 shows a second layout of a sectorized atlas according to the present principles. In this example, wherein the selected projection and mapping is the ERP, the central patch of FIGS. 6 and 7 is divided in 10 regions: eight for a large equatorial zone as in the example of FIG. 8 and two for the poles. Ten regions of the atlas are then dedicated to peripheral patches of the the ten sectors.

| Regions | Sector definition | Atlas Area |
|---|---|---|
| 8 panoramic Regions $R_{c\_pan\_i}$ for central patch | For i = 0 to 7 theta [i*45°, i*45° + 45°] and phi [−(90° + $phi_{fov}$/2), +(90° − $phi_{fov}$/2)] | 1/16 of central patch |
| 2 pole Regions $R_{c\_pol\_i}$ for central patch | theta [−180°, +180°] and phi [+(90° − $phi_{fov}$/2), +90°] theta [−180°, +180°] and phi [−(90° + $phi_{fov}$/2), −90°] | 1/4 of central patch |
| 8 panoramic Regions $R_{p\_pan\_i}$ for peripheral patches | For i = 0 to 7 theta [i*45°, i*45° + 45°] and phi [−(90° + $phi_{fov}$/2), +(90° − $phi_{fov}$/2)] | Around 1/16 of peripheral patches |
| 2 pole Regions $R_{p\_pol\_i}$ for peripheral patches | theta [−180°, +180°] and phi [+(90° − $phi_{fov}$/2), +90°] theta [−180°, +180°] and phi [−(90° + $phi_{fov}$/2), −90°] | Around 1/4 of peripheral patches |

This example layout has advantages, compared to the first layout of FIG. 8. Indeed, at the rendering side, regions of the atlas corresponding to the poles will be accessed and deprojected only when the user is looking upper or lower than a given angle (depending on the size of pole regions). In the layout of FIG. 8, when the user is looking at a pole, every central patch (that is every region) has to be accessed to get the necessary information to generate the view port image. In the layout of FIG. 9, only one pole region and some panoramic regions (for example four, depending on the width of the field of view) have to be accessed to generate the viewport image. Thus, in every case, less regions have to be accessed.

FIG. 11 shows a third layout of a sectorized atlas prepared for a cube mapping according to the present principles. In the example of FIG. 11, the 3D space of the scene is divided into six pyramidal sectors (or frustrum) corresponding to the six faces of a cube, for instance centered on the center point of the viewing bounding box. This example atlas layout may be advantageously used for a field of view (FOV) ($theta_{fov}$, $phi_{fov}$) where ($theta_{fov}$, $phi_{fov}$) is lower than (90°,90°). This FOV characteristics ensure that all pixels visible in the FOV belong to maximum three faces of the Cubemap atlas.

When the atlases are issued from several cube map projections for multiple central and peripheral cameras (pyramid vision of amplitude (90°,90°)), a sector is defined as the set of the 3D points in any camera view (central and peripheral) visible in a face of a central cube, for instance, centered on the main central viewpoint. As for the ERP case, the notion of sector for a peripheral patch is relative to its position in the cartesian coordinate system of the central camera and not the peripheral one it comes from.

| Regions | Sector definition | Atlas Area |
|---|---|---|
| 6 cubemap Regions for central patch | All point visible by a (90°, 90°) pyramid of vision in the 6 cubemap directions | 1/6 of central patch |
| 6 cubemap Regions for peripheral patches $R_{p\_cube\_i}$ | All point visible by a (90°, 90°) pyramid of vision in the 6 cubemap directions | 1/6 of peripheral patches |

At any time, the renderer selects the three regions of the cube map projection corresponding to the 3 faces of the cube visible by the current user pyramid of vision. Only pixels of these three regions are accessed to generate the viewport image.

The sectorization of the space of the scene has to be signaled in the data stream, for instance with metadata associated with the atlases divided in regions. A possible syntax for such metadata is to use the following semantic elements:

Sector Identifier (unit(8)): identifier of a sector. A sector corresponds to a contiguous volume of the space of the scene relative to a coordinate system. For example, (but not limited to) a vertical slice of a sphere. Other possible volumes may be, for instance, all pixels visible in a pyramid of vision (cube map), a bounding box, a cylinder slice (all pixels included in a theta angle around a vertical axis). Several camera views may have pixels belonging to the same sector.

All volumetric data in 3D space that appear in a given sector i are stored in the same compact 2D region $R_i$ of an atlas.

Sector descriptor: describes a portion of the space of the scene relative to a virtual camera that contain a subset of patches.

| | |
|---|---|
| Sector descriptor_param(a) { | |
|   Sector_Id | uint(8) |
|   Sector_type: enumerate type in {ERP, cubemap, cylinder,box ... } | uint(8) |
|   Sector_intrinsic_<type>_param(a) | |
| } | |

| | |
|---|---|
| Sector_intrinsic_ERP_param(a) { | |
|   Theta_min, theta_max, phi_min, phi_max | 4 × float(32) |
|   Reference-camera-id | uint(8) |
| } | |

| | |
|---|---|
| Sector_intrinsic_Cubemap_param(a) { | |
|   Cubeface_type in {left, front, right, up,down,back} | 1 × uint(8) |
|   boundingBox xmin,ymin,zmin,xmax,ymax,zmax | 6 × float(32) |
|   Reference-camera-id | uint(8) |
| } | |

| | |
|---|---|
| Sector_intrinsic_Cylinder_param(a) { | |
|   Theta_min, theta_max | 2 × float(32) |
|   Reference-camera-id | uint(8) |
| } | |

```
Sector__intrinsic_Box_param(a) {
    boundingBox xmin,ymin,zmin,xmax,ymax,zmax      6 × float(32)
    Reference-camera-id                            uint (8)
}
```

Atlas parameter syntax is used to add the field Sector_Id, attached to each patch metadata. This syntax element may comprise other data relative to patches. An Object_Id parameter may also be used, for example, for tagging several patches with different Object_Id when they are in the same Sector_Id. These two attributes are complementary and transversal.

```
atlas_param(a) {
    for (i = 0; i <= num_patches_minus1; i++ ) {
        ....
        Sector_Id[a][i]                            uint(8)
    }
}
```

Where Sector_Id[a][i] is a value of the Sector_Id for the $i^{th}$ patch of the $a^{th}$ atlas.

The top-level syntax includes a list of sector descriptors:

```
ivs_params( ) {
    ...
    Sector_params_list( )
}
```

The sector param list is defined below. Num_sectors_minus1 gives the number of distinct sectors. num_sectors_descriptors_minus1 give the number of sector_descriptor, there is one sector_descriptor for the Sector_Id.

```
Sector__params_list( ) {
    num_sectors_minus1                             uint(8)
    for (i = 0; i <= num_sectors_descriptors_minus1; i++ ) {
        Sector_descriptor_param(i)
    }
}
```

Atlas_layout_descriptor (optional): this descriptor is optional, as the implicit layout of an atlas can be deduced by parsing the Sector_Id information of each patch in atlas_param( ). This is proposed as an alternative syntax, it directly expresses the definition of 2D region {$R_i$} in the atlas corresponding to sector$_i$

```
atlas_layout_descriptor( ) {
    num_sectors_minus1                             uint(8)
    for (i = 0; i <= num_sectors minus1; i++) {
        Atlas_sector_pos_x(i)                      uint(16)
        Atlas_sector_pos_y(i)                      uint(16)
        Atlas_sector_width(i)                      uint(16)
        Atlas_sector_height(i)                     uint(16)
    }
}
```

Atlases layout, that is the division in regions and the organization of patches within each region, may be determined for one or more Group Of Pictures (GOP). Atlas images a same GOP (for example 8 or 16 successive pictures of a video data stream) may share the same layout. The next GOP may have a different layout, for instance by having a different division in regions and/or a different organization of patches within a region.

The decoding process may implement the following steps. At each new GOP, the renderer reads the Sector_Id information in the metadata stream to determinate what is the internal layout of the atlas for the GOP duration. The renderer reads and computes, directly or indirectly, the number of sectors N, the definition of the sector regions R1 . . . RN in the atlas and what are the valid angular sectors (theta, phi) and bounding boxes. The rendering device has a tracking system (e.g. the IMU of a HMD or a mouse or an external tracking system) that returns at each frame the position and the direction of the virtual camera (theta$_{user}$, phi$_{user}$), ($x_{user}, y_{user}, z_{user}$).

At each refresh of the screen, the renderer resynthesizes a new viewport frame and fetch values in the atlas in order to:

determinate which sectors match the current user pose (position+orientation) and build a list of candidate Sector_Ids. This list includes all sectors declared in the metadata that may appear in the pyramid of vision centered on the user direction, and of field of view (theta$_{FOV}$, phi$_{FOV}$).

optionally overprovision this list by appending neighboring sectors that increase the scene coverage. This overprovision ratio may be a recommended value comprised in the metadata or may be dynamically adjusted by the renderer depending on its CPU and/or GPU capacity and the current position of the user in the scene. For a still position ($x_{user}$=0, $y_{user}$=0, $z_{user}$=0), the overprovisioning ratio may be chosen to at least cover the current FOV. The more the user laterally moves away from the center position (e.g. $y_{user}$=20 cm), the more the overprovisioning ratio should be increased to also include lateral sectors on the border of the FOV. This basically trigs the read of one or two neighboring sectors in the periphery of the FOV.

configure the shaders with the list of Sector_Ids to synthetize next frame.

make shaders read only the relevant pixels (i.e. pixels in the regions of the atlas associated with selected sectors) in atlases before un-projecting (rebuilding 3D points) and re-projecting (placing in the viewport of the user pyramid of vision) them.

a possible implementation, in the state of the art, is to allocate k pixel mesh $M_i$ at each time the atlas layout changes (e.g. potentially at every GOP), a mesh $M_i$ covering all pixels of a region $R_i$ in the atlas.

another possible implementation is based on the use of a single static generic mesh for the whole atlas.

FIG. 12 illustrates a method 120 for generating a viewport image of a scene encoded in an atlas image, according to a non-limiting embodiment of the present principles. At a step 121, the atlas is obtained from a data stream. The data stream may be read from a memory or receive from a network. Metadata are obtained at the same time from the same source or from a different source. The metadata describe a division of the atlas in regions and associated a region with a sector of the space of the scene. Pixels of a region of the atlas are a projection of points of the scene located in the sector associated with the region. At a step 122, the rendered selects a set of sectors as a function of the current point of view and field of view of the virtual camera controlled by the user. Indeed, a 3DoF+ rendering device comprise means for the user to control a virtual camera to visualize the scene from a point of view in a viewing zone of the space of the scene. Sectors of the within the field of view of the viewer are selected. In a variant, neighbor sectors are selected in order to anticipate movements of the virtual camera. At a step 123, the renderer accesses the pixels of the regions of the atlas associated with the selected regions to generate the viewport image of the scene seen from the point of view of the user. An advantage of this method is that the number of accessed pixels and so of de-projected points is limited to points of viewed sectors of the space of the scene.

FIG. 13 illustrates a method 130 for encoding a scene, according to a non-limiting embodiment of the present principles. At a step 131, the scene is divided in non-overlapping sectors. Patches are obtained, by sector. A patch is a picture that is a projection of points of the scene comprised in a unique sector. At a step 132, a region layout is selected for the atlas. Each region of the layout is associated with a unique sector of the space of the scene. A sector may be associated with several regions. At this step, patches are packed in regions associated with their sector. The atlas is generated and encoded in a data stream with metadata describing the regions and associating regions with their sector of the space of the scene. In a variant, metadata are encoded in a different data stream.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   obtaining, from a data stream, an image divided in central regions and peripheral regions, wherein a central region is a part of a central patch generated by projecting points of a 3D scene according to a central point of view and wherein a peripheral region is packing peripheral patches generated by projecting points of the 3D scene according to points of view different from the central point of view, the data stream comprising metadata associating each central region and peripheral region of the image with one sector of a space of the 3D scene, a sector being a disjointed part of the space defined by a solid angle pointing the central point of view;
   selecting at least one sector according to a field of view pointing the central point of view; and
   generating a viewport image of the 3D scene for the field of view by accessing pixels of the central regions and the peripheral regions of the image associated with the selected at least one sector in the metadata.

2. The method of claim 1, wherein the central regions and the peripheral regions are associated with one region and are a projection of points of the 3D scene comprised in the sector associated with the one region.

3. The method of claim 1, wherein the sector of the space of the 3D scene is associated with two regions, a first region being a central region, and a second region being a peripheral region.

4. The method of claim 2, wherein the sector of the space of the 3D scene is associated with two regions, a first region being a central region, and a second region being a peripheral region.

5. A device comprising a processor configured for:
obtaining, from a data stream, an image divided in central regions and peripheral regions, wherein a central region is a part of a central patch generated by projecting points of a 3D scene according to a central point of view and wherein a peripheral region is packing peripheral patches generated by projecting points of the 3D scene according to points of view different from the central point of view, the data stream comprising metadata associating each central region and peripheral region of the image with one sector of a space of the 3D scene, a sector being a disjointed part of the space defined by a solid angle pointing the central point of view;
selecting at least one sector according to a field of view pointing the central point of view; and
generating a viewport image of the 3D scene for the field of view by accessing pixels of the central regions and the peripheral regions of the image associated with the selected at least one sector in the metadata.

6. The device of claim 5, wherein the central regions and the peripheral regions are associated with one region and are a projection of points of the 3D scene comprised in the sector associated with the one region.

7. The device of claim 5, wherein the sector of the space of the 3D scene is associated with two regions, a first region being a central region, and a second region being a peripheral region.

8. The device of claim 6, wherein the sector of the space of the 3D scene is associated with two regions, a first region being a central region, and a second region being a peripheral region.

9. A method comprising:
generating an image divided in central regions and peripheral regions, wherein a central region is a part of a central patch generated by projecting points of a 3D scene according to a central point of view and wherein a peripheral region is packing peripheral patches generated by projecting points of the 3D scene according to points of view different from the central point of view, each central region and peripheral region being associated with one sector of a space of the 3D scene, a sector being a disjointed part of the space defined by a solid angle pointing the central point of view, wherein points of the 3D scene comprised in a sector are projected into pixels of a patch picture, the patch picture being packed in the central region or peripheral region associated with the sector; and
encoding, in a data stream, the image and metadata associating each central and peripheral region of the image with the sector of the space of the 3D scene.

10. The method of claim 9, wherein the central regions and the peripheral regions are associated with one region and are a projection of points of the 3D scene comprised in the sector associated with the one region.

11. The method of claim 9, wherein the sector of the space of the 3D scene is associated with two regions, a first region being a central region, and a second region being a peripheral region.

12. The method of claim 10, wherein the sector of the space of the 3D scene is associated with two regions, a first region being a central region, and a second region being a peripheral region.

13. A device comprising a processor configured for:
generating an image divided in central regions and peripheral regions, wherein a central region is a part of a central patch generated by projecting points of a 3D scene according to a central point of view and wherein a peripheral region is packing peripheral patches generated by projecting points of the 3D scene according to points of view different from the central point of view, each central region and peripheral region being associated with one sector of a space of the 3D scene, a sector being a disjointed part of the space defined by a solid angle pointing the central point of view, wherein points of the 3D scene comprised in a sector are projected into pixels of a patch picture, the patch picture being packed in the central region or the peripheral region associated with the sector; and
encoding, in a data stream, the image and metadata associating each central and peripheral region of the image with the sector of the space of the 3D scene.

14. The device of claim 13, wherein the central regions and the peripheral regions are associated with one region and are a projection of points of the 3D scene comprised in the sector associated with the one region.

15. The device of claim 13, wherein the sector of the space of the 3D scene is associated with two regions, a first region being a central region, and a second region being a peripheral region.

16. The device of claim 14, wherein the sector of the space of the 3D scene is associated with two regions, a first region being a central region, and a second region being a peripheral region.

17. A non-transitory computer readable medium having instructions stored thereon which, when executed by one or more processors, cause the one or more processors to perform the method of claim 1.

18. A non-transitory computer readable medium having instructions stored thereon which, when executed by one or more processors, cause the one or more processors to perform the method of claim 9.

* * * * *